Figure 1:
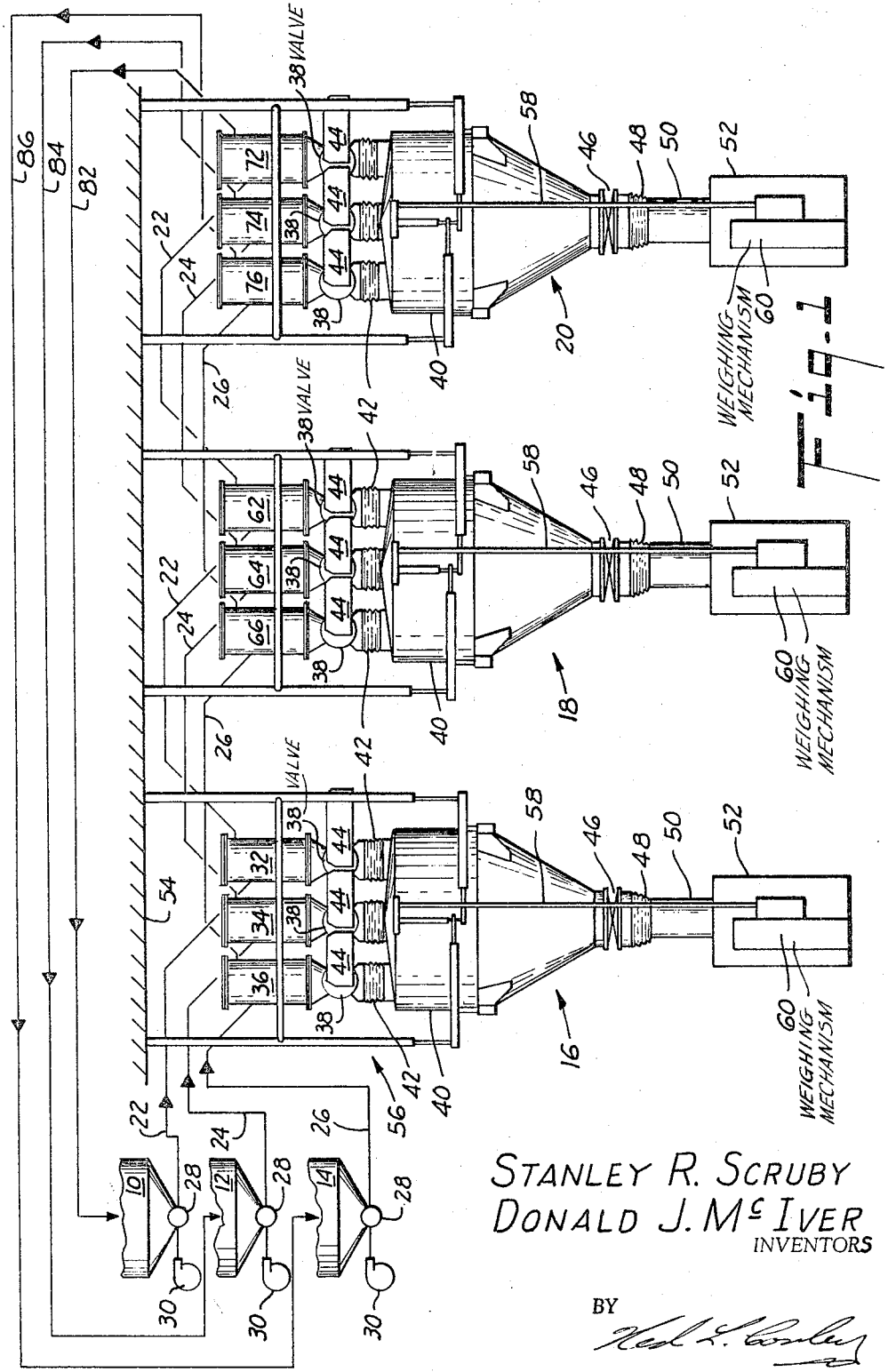

March 28, 1967 S. R. SCRUBY ETAL 3,311,418
HANDLING OF PULVERULENT MATERIALS
Filed July 24, 1964 2 Sheets-Sheet 2

STANLEY R. SCRUBY
DONALD J. McIVER
INVENTORS

BY
ATTORNEY though the conduit has been freed of the flour entrained in the air in the conduit at the time the flow is terminated at the intake of the scale hopper. If the flowing flour is allowed to become static in this conduit, the conduit will become clogged with flour so that it will not flow the next time the flow of air commences. When the lines are cleared, however, it is then necessary to refill the conduit with the fluidized flour in order to again initiate flow to the scale hopper to form the next batch. This means that there is a time delay while flow of flour through the conduit is initiated.

According to the present invention, means and a method are provided for insuring accurate weighing of batches of material without any loss of time between the weighing of sequential batches. In a preferred embodiment of the invention a pressure vessel is provided just above the scale hopper. Means such as a rotary valve in the bottom of the pressure vessel is used to transfer material from the pressure vessel to the scale hopper. Fluidized pulverulent material is supplied to the pressure vessel through a material transfer conduit from the storage bin. An outlet from the pressure vessel forms a continuation of the material transfer conduit. The flow of the fluidized material is continuous through the material transfer conduit, so that material flows into the pressure vessel until it is almost filled, at which time all of the flow will pass through the pressure vessel and on out the discharge conduit therefrom. When it is desired to measure out a batch of the material, the rotary valve at the bottom of the pressure vessel is operated to deliver material to the scale hopper until the desired amount is in the scale hopper. While delivery is being made to the scale hopper, flow through the conduit maintains an adequate supply of the material in the pressure vessel. Thus material for charging the scale hopper is always immediately available without the necessity of waiting for the material transfer conduit to fill up.

The apparatus and method of this invention are particularly useful in connection with an operation where a plurality of mixers are being used. Thus the material transfer conduit leading from the storage bin may connect together a plurality of pressure vessels in series with each other and a return conduit may be provided from the last pressure vessel of the series to return the flow back to the storage bin. Each of the pressure vessels will therefore be kept loaded at all times for delivery of material to the scale hopper associated with such pressure vessel. As heretofore stated, the method and apparatus are also applicable to installations wherein a plurality of different materials are supplied to a mixer.

Figure 2:
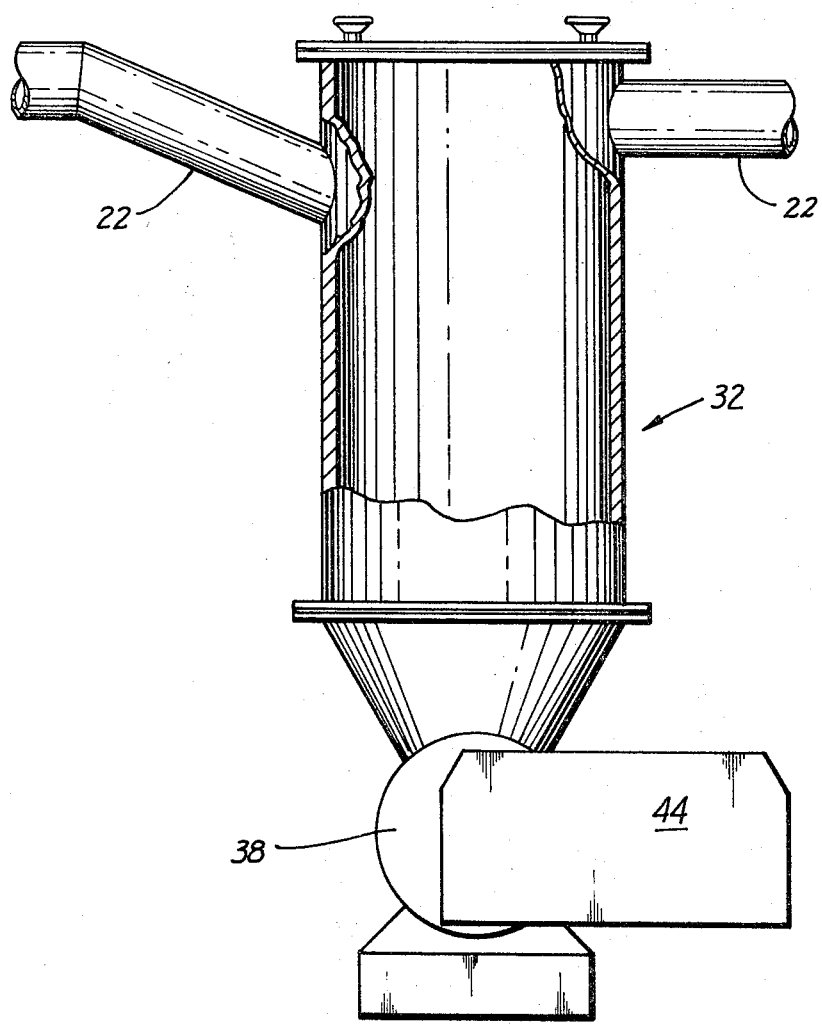

For a better understanding of the invention reference is now made to the following description and to the accompanying drawings wherein:

FIGURE 1 is a somewhat diagrammatic elevational view of one embodiment of a material handling system constructed according to the present invention; and FIGURE 2 is an enlarged elevational view, partly in section, of one embodiment of a pressure vessel as used in the system of this invention.

Referring in detail to the drawing, FIGURE 1 illustrates one embodiment of a system constructed according to this invention, said system including a plurality of storage bins 10, 12 and 14 and a plurality of mixer batteries 16, 18 and 20. Material transfer conduits 22, 24 and 26 are provided to transfer fluidized pulverulent material from the storage bins to the mixer batteries. At the bottom of each of the storage bins 10, 12 and 14 a rotary feeder 28, of a type well known in the art, is provided. Blowers 30 deliver a flow of air through the rotary feeders. The rotary feeders are operated to carry pulverulent material from the hoppers down into the flow of air so that it is blown out through the conduits 22, 24 and 26 and thereby impelled therethrough.

In the embodiment shown, the mixer batteries are all substantially identical in construction. Battery 16 comprises a plurality of pressure receivers, or pressure vessels, 32, 34 and 36, each of which is connected in one of the material transfer conduits 22, 24 and 26 so as to form a part of the conduit. Each pressure receiver has at its lower end a rotary valve 38, of a type well known in the art, which is adapted upon rotation thereof to transfer material from the pressure receiver to the scale hopper positioned below the pressure receivers. A flexible flow sock 42 provides means communicating the scale hopper with the valve 38 on the lower end of each pressure receiver. Valves 38 are driven by two-speed motors 44.

The scale hopper is of conventional type having at its lower end a quick-dump valve, such as a butterfly valve 46, and a flexible flow sock 48 through which material may be dumped into conduit 50 and thence into a mixer 52. The scale hopper is suspended from the ceiling 54 of the building by a suitable suspension means indicated generally at 56. The suspension means includes suitable linkage, as is well known in the art, including the rod 58, to actuate the weighing mechanism 60 so as to indicate the load in the scale hopper.

The material transfer conduits 22, 24, and 26 lead from the pressure receivers 32, 34 and 36 to pressure receivers 62, 64 and 66, respectively, in the mixer battery 18. From these pressure receivers they then lead to the pressure receivers 72, 74 and 76, respectively, in mixer battery 20. Return conduits 82, 84 and 86 then lead from the last pressure receivers back to the storage bins 10, 12 and 14.

Thus the material transfer conduit 22 connects in series pressure receivers 32, 62, and 72, and return conduit 82 connects the pressure receiver 72 back with the storage bin 10. Similarly, the other receivers are connected in series by the material transfer conduits.

FIGURE 2 of the drawing illustrates a typical pressure receiver 32. As shown here the material transfer conduit 22 leads into one side of the pressure receiver, preferably near its upper end, and preferably at an angle at least 15 or 20 degrees below the horizontal. On the other side of the pressure receiver the conduit 22 continues, here extending substantially horizontally from near the upper end of the pressure receiver. The idea here is that the conduit coming into the pressure receiver is preferably not precisely in line with the conduit leading out of the pressure receiver, but is misaligned so as to avoid a possible aspiration effect. Any arrangement of the conduits which accomplish this purpose will give satisfactory results.

In the operation of the apparatus of this invention, the three storage bins 10, 12 and 14 may for example contain three different kinds of flour which are to be mixed in desired proportions, or which are used successively in the mixing of various kinds of dough. In one method of operation, for example, the blower 30 and rotary feeder 28 which are connected at the beginning of conduit 22 are operated to cause fluidized material to flow through the material transfer conduit 22 and into the pressure receiver 32. The conduit 22 is open through the pressure receiver at all times so that some flow continues on out of this pressure receiver. However the dry material will build up in the pressure receiver until it is substantially full, after which time all the material delivered through conduit 22 passes on through pressure receiver 32 and through pressure receiver 62. When this pressure receiver is filled, all of the material passes on through pressure receiver 72 until it is filled. Any remaining flow then is returned through return conduit 82 to the storage bin 10.

When it is desired to measure out a batch of material from, for example, the pressure vessel 32, the rotary valve 38 is operated to transfer material from the pressure vessel 32 to the scale hopper 40 until the weighing device 60 indicates that the desired amount has been transferred to the scale hopper. The valve 38 is then stopped to cut off transfer of material to the scale hopper. Preferably motor 44 is a two-speed motor so the initial transfer of material can be at a relatively high speed and the transfer rate can be slowed down as the desired total weight is approached. It will be apparent that material flowing through the conduit 22 will immediately replace that withdrawn through the valve 38 so that the vessel 32 is always provided with sufficient material to charge the scale hopper. For this purpose flow through the conduits 22, 24 and 26 is continuous during the time weighing out of batches is taking place.

Where different materials are being mixed together, the rotary valves 38 on the vessels 32, 34 and 36 may be operated successively to transfer desired amounts of different solid materials to the scale hopper. Once the desired amounts are weighed out, the butterfly valve 46 at the lower end of the scale hopper is opened to dump the contents of the scale hopper into the mixer 52. Upon the closing of the butterfly valve, the valves 38 may again be operated one after the other to recharge the scale hopper. There is no delay because the vessels 32, 34 and 36 are filled as soon as they are emptied and have in them adequate material to recharge the scale hopper.

It will be apparent that in an installation where there are a number of mixer batteries, as for example of the type shown in FIGURE 1 of the drawing, the system and method of this invention are particularly advantageous in that a single material transfer conduit can be used to charge a plurality of pressure receivers. Each pressure receiver requires only a small portion of the total volume of solid materials passed through the material transfer conduit which connects them in series, so that the remainder of the material passing therethrough is available for distribution to the other pressure receivers in that series.

The metering of flow into the scale hoppers may be accomplished, according to this invention, by means of the rotary valves 38, which are capable of very accurate control of the amount of material fed into the scale hoppers. Thus the weight of the batches can be more accurately controlled than is possible in prior art systems as where the flow of fluidized material must be shut off to stop the feeding of the material into the scale hopper.

Many modifications of the invention as shown and described herein will be apparent to those skilled in the art. Therefore the invention is not to be construed to be limited to the specific embodiment shown and described but only as set forth by the following claim.

We claim:

A batching system for preparing batches of plural dissimilar pulverulent solids which comprises
a plurality of scale hoppers,
weight indicating means engaged by each scale hopper,
a plurality of pressure vesesls above each scale hopper, each scale hopper with its associated pressure vessels constituting a battery,
conduits from the bottoms of the pressure vessels in each battery to the scale hopper in the battery,
a rotary valve in each conduit,
a plurality of material transfer conduits, each material transfer conduit connecting one pressure vessel in each battery in series with each other, the connections to the pressure vessels being at the tops of the pressure vessels,
a storage bin at the beginning of each material transfer conduit,
a return conduit from the last pressure vessel in each series to a storage bin,
said storage bin, pressure vessels, material transfer conduits and return conduit being continuously in open communication during operation, and
means for continuously impelling fluidized solid material through each material transfer conduit and its communicating pressure vessels and return conduit.

References Cited by the Examiner

UNITED STATES PATENTS

| | | | |
|---|---|---|---|
| 1,248,851 | 12/1916 | Heisler | 302—65 X |
| 1,256,017 | 2/1918 | Hicks | 302—3 X |
| 2,903,301 | 9/1959 | Pfening | 302—28 |

RICHARD B. WILKINSON, *Primary Examiner.*

G. H. MILLER, Jr., *Assistant Examiner.*